United States Patent [19]
McConnaughay

[11] 3,802,899
[45] Apr. 9, 1974

[54] METHOD OF MAKING A PAVING COMPOSITION

[76] Inventor: Kenneth E. McConnaughay, P.O. Box 1457, Lafayette, Ind. 47902

[22] Filed: Oct. 15, 1971

[21] Appl. No.: 189,770

[52] U.S. Cl................... 106/281, 106/96, 106/97, 106/98, 106/283; 117/100
[51] Int. Cl. .....................C08h 13/00, B28c 5/00, C08h 17/02
[58] Field of Search ................................. 94/19–23; 106/280–284, 38.8, 286, 288, 122, 97, 98, 102, 117–120; 117/100

[56] References Cited
UNITED STATES PATENTS

| | | |
|---|---|---|
| 2,758,033 | 8/1956 | Burney, Jr. et al. ................. 106/97 |
| 3,078,175 | 2/1963 | DeLisle.............................. 106/97 |
| 3,432,322 | 3/1969 | Rogers................................ 106/281 |
| 3,501,323 | 3/1970 | Moorehead.......................... 106/97 |
| 3,513,005 | 5/1970 | Bradshaw et al. ............... 106/280 X |

*Primary Examiner*—Joseph L. Schofer
*Assistant Examiner*—H. J. Lilling
*Attorney, Agent, or Firm*—Trask, Jenkins & Hanley

[57] ABSTRACT

A method of producing a paving composition in which sand is mixed with a binder and the mixture is allowed to cure into a rigid mass. The rigid mass is broken up into a particulate aggregate that is mixed with a second binder to form a finished paving composition.

5 Claims, No Drawings

METHOD OF MAKING A PAVING COMPOSITION

BACKGROUND OF THE INVENTION

In various areas of the world the sand is weak and not suitable for the production of roads and other paved surfaces when it is mixed with conventional binders. A weak sand is generally considered to be one having a Florida bearing value of about 20 psi or less. These weak sands when mixed with various binders in the normal proportions fail to provide paved surfaces having satisfactory strengths. Thus, when such sands are mixed with a bitumen, they fail to provide a paving composition having a Hveem strength of about 25, the generally accepted minimum strength for a road base composition, or a Hveem strength of about 35, the generally accepted minimum for a heavy duty road surface composition, or a Hveem strength of about 28, the generally accepted minimum for a secondary road surface composition.

Because sand and aggregate mixtures containing sand are high specific gravity materials that form a very large proportion of the volume of a paving composition, the cost of shipping high strength sand into areas containing low strength sand is usually economically prohibitive. It is therefore an object of this invention to provide a method of forming a high strength paving composition from weak sands or low-grade aggregate mixtures containing such weak sands in which said sands or aggregate mixtures are mixed with a binder and the resulting composition is allowed to cure into a rigid mass. The mass is then broken up into particles having the desired size gradation and said particles are then mixed with a bituminous material to form the finished paving composition. This method provides a finished paving composition having strength properties superior to the rigid mass and a Hveem strength greater than the composition which would have resulted from directly mixing the sand or aggregate mixture containing such sand with the bituminous material without first forming and breaking up the rigid mass.

SUMMARY OF THE INVENTION

In accordance with one form of the invention, a low-grade or weak sand is mixed with Portland cement and water. The sand, cement and water are mixed in proportions equal to 650 pounds of sand, 40 pounds of cement, and 20 pounds of water. The mixture is then spread and allowed to set or cure into a rigid layer. The layer is broken up into particles having a size ranging from about one-inch to granular. This forms a layer of the processed aggregate.

A bituminous material is then sprayed over the layer of the processed aggregate and mixed therewith to coat the aggregate particles with 5 percent of said bituminous material based upon the weight of said aggregate. The coated aggregate particles are then leveled and compacted to form the finished paved surface.

DETAILED DESCRIPTION OF THE EMBODIMENT OF THE INVENTION

Many areas of the world contain only weak sands or low-grade aggregates containing such sands. These sands have a Florida bearing value of about 20 psi or less, thereby making them unsuitable for the production of roads and other paved surfaces. This invention is concerned with up-grading these sands and aggregate mixtures containing them so that they may be used to produce paving compositions which will have satisfactory strength characteristics. In order for a paving composition to have a satisfactory strength, it should have a minimum Hveem strength of about 25 when it is to be used in forming a road base and a minimum Hveem strength of 28 to 35 when it is to be used in forming a road surface material.

In up-grading such a sand or low-grade aggregate mixture, it is mixed with a first binder such as Portland or other hydraulic cements, a hard bituminous material, pozzuolana cements, clays, plastics, or synthetic resins, sodium silicate insolublized with calcium chloride, or the like. A hard bituminous material is one in which the bitumen has a penetration value of about 20 or less. The binder is allowed to cure or set so that the mixture forms a rigid mass. The rigid mass is then broken up into particles having the desired size gradation to form an up-graded processed aggregate. The up-graded processed aggregate is then mixed with a bituminous binder material to form the finished paving composition.

When the low strength sand forms part of an aggregate mixture, it is desirable to separate such sand from the mixture. The sand can then be mixed with the first binder and the mixture allowed to cure into a rigid mass. The rigid mass is broken up into the desired particle size of processed aggregate, combined with the aggregate previously separated from the aggregate mixture, and mixed with the bituminous material.

Alternately, the weak sand can be formed into the processed aggregate and then mixed with additional amounts of untreated weak sand to form an aggregate mixture which can be mixed with the bituminous material to form the finished composition.

When Portland cement or insolublized sodium silicate is mixed with the weak sand to form the processed aggregate, it is mixed therewith at the rate of from about 4 to about 16 percent based upon the weight of the sand. If greater amounts of these binders are employed, I have found that the resulting product is difficult to break up into the processed aggregate. If, on the other hand, lesser amounts of the binders are employed, I have found that the binders will not properly cure and the resulting product breaks up into fine granular particles. When the processed aggregate is formed with Portland cement it is frequently desirable to spray a thin coat of the bituminous binder over the layer of the sand, cement and water mixture to insure a proper hydration of the cement. In such cases, the bituminous material is sprayed over said layer at the rate of about .1 gallon of said binder per 650 pounds of sand.

When the weak sand is mixed with a hard bituminous material to form the processed aggregate, the bituminous material may consist of an asphalt cement, emulsified asphalt, cut-back asphalt, tar, pitch, or combinations thereof. The bitumen employed should have a penetration value not substantially greater than about 20 so that the processed aggregate will be brittle and thus relatively easy to break up into the desired particle gradation. The bituminous material should be added to the sand at the rate of from about 5 to about 8 percent by weight of the sand. If lesser amounts of the hard bitumen are employed, the processed aggregate particles produced may be too small and/or too friable. If, on the other hand, greater amounts of bitumen are employed, the processed aggregate may be too difficult to break up into a desired particle size. The bituminous material may be added to the sand either hot to cold.

Examples of plastics and clays that may be employed as binders mixed with the sand to form the processed aggregate are montmorillonite, polyethylene, polypropylene, epoxy resins, or other synthetic resins, furfural condensation products, and plastic clays treated with an anti-swelling agent such as hydrated lime and the like. Such clays and plastics are added to the sand at a rate such that they are present in the processed aggregate in an amount of from about 2 to about 16 percent. As with the Portland cement and bituminous materials, if amounts of the clays and plastics greater than this range are employed, the processed aggregate may be difficult to break up into the desired particle size. If lesser amounts are employed, the aggregate particles may be too small and/or too friable.

The processed aggregate may be formed in a mixer or in situ. When it is formed in a mixer, the sand is mixed with the binder in the mixer, the mixture spread on a surface, cured, and then broken up. If formed in situ, the sand is spread over a surface and the binder is mixed therewith. After the mixture has cured into a rigid mass, it is broken up into the desired particle size. In either case, the rigid mass can be broken up with conventional road equipment such as a sheep-foot tamper, portable road crusher, or the like.

When the weak sand is contained in a low-grade aggregate mixture also containing coarse aggregate particles, the sand is removed therefrom, treated with the binder to form the processed aggregate and then recombined with the coarse aggregate for subsequently mixing with the bituminous second binder to form the finished paving composition. Again, this type of operation may be performed in a plant or in situ. When it is performed in a plant, the sand is separated from the coarse aggregate as by conventional screening methods. The screened sand is then treated with the binder, the mixture is cured, broken up, and then recombined with the coarse aggregate. When performed in situ, the coarse aggregate-sand mixture is spread over a surface and stirred with a Seaman mixer, grader, disc or harrow to bring the coarse aggregate particles to the surface. The coarse aggregate particles are then removed, such as by grading, and the remaining sand is treated in situ with a binder in the manner previously described. After the binder and sand have cured into a rigid mass, the rigid mass is broken up into the desired particle size, and then the previously removed coarse aggregate is remixed with the formed particles for subsequent mixing with the bituminous second binder.

As previously indicated the processed aggregate can also be mixed with additional quantities of untreated weak sand and that mixture can then be mixed with the bituminous second binder. In such operations, from 20 to about 70 percent of the untreated weak sand can be mixed with processed aggregate.

After the processed aggregate is formed, it is mixed with a bituminous second binder to form the finished paving composition. The second binder is a bituminous binder such as emulsified asphalt (cationic, anionic, or nonionic), asphalt, cut-back asphalt, tar, pitch, or combinations thereof. The bituminous material employed in making the finished composition is substantially softer than that which may be used in forming the processed aggregate so that the finished pavement will not be brittle and easily subjected to cracking. Thus, where the bitumen which is employed as the binder in making the processed aggregate has a maximum penetration value of about 20, the bitumen which is employed as the binder in making the finished composition has a minimum penetration value of about 70.

The amount of the bituminous second binder, that is added to the processed aggregate to form the finished paving composition will depend upon the type and specification of the surface to be formed. Normally, in forming the finished composition, the amount of the bituminous material employed provides from about 3.5 to about 6.5 percent of bitumen based upon the weight of the processed aggregate mixture, whether that mixture be the processed aggregate alone or the processed aggregate mixed with coarse aggregate or weak sand.

The examples which follow are illustrative of the process.

EXAMPLE 1

A sand having a Florida bearing value of 25 psi was spread over a surface at the rate of 650 pounds per square yard. A slurry of Portland cement was then mixed with the sand in situ at the rate of 40 pounds of Portland cement and 20 pounds of water per 650 pounds of sand. The mixture was allowed to cure for two days, after which it was broken up by a sheep-foot tamper to form the processed aggregate having particles in a size gradation of one inch or less. The particles were then sprayed with a cut-back asphalt mixture containing by volume 65 percent of an 80–120 penetration asphalt and 35 percent naphtha at a rate to provide an asphalt content of 5 percent based upon the weight of the processed aggregate. After spraying, the cut-back asphalt was mixed with the aggregate particles with a disc to coat the particles with the asphalt. The surface was then leveled with a grader and compacted with a tire roller. This produced a finished paving composition having a Hveem strength of 30.

EXAMPLE 2

A sand having a Florida bearing value of 12 psi was mixed with an asphaltic emulsion comprising 60 percent of a 10–20 penetration asphalt, 2 percent vinsol resin NVX, and 38 percent water. The emulsion was added at a rate to provide a residual asphalt content of 6 percent. The sand and emulsion were mixed together in a conventional hot mix plant and discharged therefrom at 300° F. The coated sand particles were then spread over the surface to be paved, and the composition was allowed to cure for 48 hours into a rigid layer 2 inches thick. After the layer had cured, it was broken up with a portable road crusher to form a processed aggregate consisting of particles having a size gradation of from about one inch to about one-eighth inch. After the breaking operation, an emulsion comprising 60 percent of a 150 penetration asphalt, 1 percent vinsol resin NVX, and 39 percent water was sprayed on the aggregate particles in an amount to provide 4 percent of asphalt based upon the weight of the processed aggregate. The sprayed aggregate particles were then disced to coat them with the second emulsion, the surface leveled with a road grader, and then compacted with a steel three-wheel roller. The resulting composition had a Hveem strength of 30.

EXAMPLE 3

A sand having a Florida bearing value of 20 psi was mixed in the manner described in Example 1 with a binder consisting of montomorillonite clay, hydrated lime and water. The clay, lime and water were added to the sand at the rate of 10 percent, 1 and 10 percent respectively, based upon the weight of the sand. The mixture was allowed to cure for 4 days into a rigid layer 3 inches thick. After curing, the layer was broken by a sheep-foot tamper to form a processed aggregate consisting of particles having a size range of from about one and one-half inches to about one-eighth inch. After the particles had been formed, they were mixed with the cut-back asphalt described in Example 1 in the same manner and quantity described in Example 1. The resulting composition was laid on a surface, graded and compacted. It had a Hveem strength of 25.

EXAMPLE 4

A mixture consisting of 85 percent sand having a Florida bearing value of 15 psi, 7 percent hydrated lime, and 8 percent pozzoulana was mixed with water equal to 8 percent of the weight dry material. The resulting mixture was spread 3 inches thick over a surface, allowed to cure five days into a rigid mass and then broken up by a sheep-foot tamper to form a processed aggregate consisting of particles having a size gradation of from about one and one-half inch to about one-eighth inch. An equal quantity by weight of sand having a Florida bearing value of 15 psi was mixed with the processed aggregate in a mixer. The processed aggregate-sand mixture was heated to 285° F. and mixed in a mixer with an 85–100 penetration asphalt also heated to 285° F. The asphalt was present in an amount equal to 6 percent of the weight of the aggregate-sand mixture. The finished composition discharged from the mixer was laid on a surface, graded and compacted. It had a Hveem strength of 35.

EXAMPLE 5

A low-grade aggregate all passing a one and one-half inch screen and 75 percent passing a one-fourth inch screen was spread over a surface at the rate of 650 pounds per square yard. The sand in the aggregate had a Florida bearing value of 12 psi. The aggregate was stirred with a slow-turning Seaman mixer which brought the coarse aggregate particles to the surface. The coarse aggregate was then bladed by a road grader onto a shoulder surface, and the remaining fine aggregate and sand was mixed with a slurry of Portland cement at the rate of 40 pounds of Portland cement and 20 pounds of water per 650 pounds of sand and fine aggregate. After mixing, the mixture was spread into a layer 2 inches deep and the surface of said layer was sprayed at the rate of .1 gallon per square yard with an asphaltic emulsion consisting of 60 percent of a 150 penetration asphalt, 1 percent Vinsol resin NVX, and 39 percent water. The layer was allowed to cure for five days into a rigid mass. After curing, the mass was broken by a sheep-foot tamper into particles having a size range of from about one-inch to about one-eighth inch. The coarse aggregate particles, which had previously been removed, were then spread back over the broken up particles and mixed therewith by a disc to form the processed aggregate mixture. The emulsion that had been previously sprayed was then sprayed onto the aggregate mixture and mixed therewith with a harrow. After mixing, the mixture was rolled with a tire roller to a thickness of six inches. Said emulsion was mixed with the aggregate mixture at a rate to provide 4 percent asphalt in the finished composition based upon the weight of the aggregate mixture. The finished composition had a Hveem strength of 30.

While in each of the examples just described, the bituminous second binder was mixed with the processed aggregate immediately upon the formation of the said processed aggregate, it is to be understood, of course, that said aggregate can be stock-piled and stored for subsequent mixing with the second binder at any desired time. And, as illustrated by those examples, various combinations of binders may be employed in forming the processed aggregate and mixed with said processed aggregate to form the finished paving composition, the only restriction being that the binder used in forming the processed aggregate form a layer composition which can be easily broken to form the processed aggregate particles of desired gradation.

I claim:

1. A method of making a paving composition comprising the steps of mixing sand with a first binder adapted to bind said sand into a rigid mass; said first binder being selected from the class consisting of a bituminous material having a bitumen with a penetration value not greater than 20, and hydrated Portland cement Portland cement, pozzuolana cement, hydrated lime, sodium silicate insolubilized with calcium chloride, and clay said first binder being added to said sand at the rate to provide from about 5 to about 8 percent of bitumen based upon the weight of the sand when said bituminous material is employed and being added to said sand at the rate of from about 4 to about 16 percent based upon the weight of the sand when any of the other members of said class of first binders is employed; curing said sand and first binder into a rigid mass; breaking said mass into a particulate processed aggregate; and mixing an aggregate mixture containing at least a portion of said processed aggregate with a bituminous second binder to form a finished paving composition; said second binder having a minimum penetration value of 70 and being added at a rate to provide from about 3.5 to about 6.5 percent of bitumen based upon the weight of the aggregate mixture.

2. The method of making a paving composition as set forth in claim 1 in which said clay is montmorillonite.

3. The method of making a paving composition as set forth in claim 1 in which said clay is a plastic clay treated with an anti-swelling agent.

4. The method as set forth in claim 1 with the addition that said first binder is Portland cement mixed with said sand at the rate of from about 4 to about 16 percent based upon the weight of the sand, and a coating of said bituminous second binder material is sprayed over said rigid mass at the rate of about .1 gallon per 650 pounds of said sand prior to said curing.

5. The method as set forth in claim 1 with the addition that from about 20 to about 70 percent of said sand is mixed with the processed aggregate to form said aggregate mixture.

* * * * *